INVENTOR.
Dean B. Harrington

United States Patent Office 3,152,273
Patented Oct. 6, 1964

3,152,273
POLYPHASE GENERATOR WINDINGS PROVIDED WITH THREE PARALLEL CONNECTED CIRCUITS PER PHASE
Dean B. Harrington, Saratoga, N.Y., assignor to General Electric Company, a corporation of New York
Filed Aug. 23, 1960, Ser. No. 51,384
7 Claims. (Cl. 310—198)

The present invention relates to dynamo-electric machines, and more particularly to improved armature windings for polyphase generators of large siize.

A conventional turbine-driven polyphase generator of large size comprises a stationary armature element and a cooperating rotatable field element, and may be operative to generate 3-phase electric power at a frequency of 60 cycles, whereby the field element, if of 2-pole construction, is rotated at 3600 r.p.m. In the generator, the armature element or core is formed of magnetizable material and is normally provided with an elongated cylindrical opening therethrough that is bounded by a number of angularly spaced-apart winding slots, in which a composite 3-phase armature winding is carried, the armature winding including three individual phases that are frequently connected in Y or star relation to supply the load. The field element is also formed of magnetizable material and is normally of the elongated cylindrical-rotor type and carries a field winding, the field element being arranged in the armature opening and being operative upon rotation to induce phase voltages in the respective phases of the armature winding.

Ordinarily, each phase of the armature winding includes a number of phase belts each provided with a plurality of series connected coils each having two coil sides, the coil sides being distributed in the winding slots of the armature element; the armature winding is arranged in two layers so that each winding slot receives two of the coil sides respectively disposed in the top and in the bottom thereof; and each of the coil sides includes an insulating casing enclosing the conductors thereof for the purpose of electrically insulating the coil side from the contiguous coil side and from the armature element.

In directly cooled machines, each of the winding slots also accommodates facility for cooling the two contained coil sides, which cooling facility ordinarily includes a duct arrangement through which a current of air or other gas, or stream of liquid is forced; whereby each of the slots must accommodate two of the coil sides, as well as the cooling facility therefor; and each of the coil sides includes the conductors thereof and the enclosing insulating casing.

Now in the design of polyphase generators, there is an ever-increasing demand for greater power ratings; whereby the competition for space in the armature between the magnetic material thereof and the winding slots therein, and among the several elements arranged in each winding slot thereof, presents design problems of ever-increasing complexity.

In order to obtain a maximum power output from a polyphase generator structure of given physical dimensions, it has been proposed in U.S. Patent No. 2,778,963, granted on January 22, 1957 to Rudolph Habermann, Jr., that each phase of the armature winding be provided with three parallel circuits arranged in a pair of series connected sections respectively disposed in a pair of oppositely poled phase belts, wherein the coil sides of the three parallel circuits are arranged in a predetermined sequence in the slots in the phase belts in order to minimize voltage and phase unbalance among the three individual circuits of the phase mentioned. While the arrangement of Habermann is entirely satisfactory for the fundamental purpose intended, this winding arrangement introduces a substantial manufacturing difficulty, in that the series connected coil sides of each circuit necessarily comprise end turns at one end of the armature winding and connecting end straps at the other end of the armature winding, and while the end turns at the one end of the armature winding may be of simple and symmetrical construction, the connecting end straps at the other end of the armature winding are of unduly complicated and unsymmetrical construction; whereby this winding pattern of Habermann is more difficult to manufacture and substantially more expensive to produce than is desirable.

Accordingly, it is a general object of the present invention to provide in a polyphase generator, an improved arrangement of the composite armature winding so that an increased power output may be realized from a generator structure of given physical dimensions, wherein each phase of the armature winding is provided with three parallel circuits arranged in a pair of series connected sections respectively disposed in a pair of oppositely poled phase belts, and wherein each circuit at one end of the armature winding comprises end turns between the respective coil sides of the coils thereof that are of simple and symmetrical construction and each circuit at the other end of the armature winding comprises connecting end straps between the coil sides of the respective coils thereof that are also of simple and symmetrical construction.

A further object of the invention is to provide a dynamoelectric machine having a polyphase winding, including in each phase thereof three parallel circuits arranged in a pair of series connected sections respectively disposed in a pair of oppositely poled phase belts, wherein each section of the three parallel circuits in each phase belt comprises a given number of series connected coils, each having two coil sides, and wherein the coil sides of the coils in the three parallel circuits in each phase are arranged in a predetermined and improved sequence in the slots in the two phase belts thereof, so as to obtain minimum voltage and phase unbalance among the individual ones of the three parallel circuits in the phase, while preserving simplicity of the mechanical construction and arrangement of the coils comprising the three circuits of the phase.

A still further object of the invention is to provide a dynamoelectric machine of the character described having a polyphase winding incorporating an improved and simplified arrangement of the elements thereof.

Further features of the invention pertain to the particular arrangement of the elements of the polyphase generator; whereby the above-outlined and additional operating features thereof are attained.

The invention, both as to its organization and principle of operation, together with further objects and advantages thereof, will best be understood by reference to the following specification, taken in connection with the accompanying drawings, in which.

Figure 1:
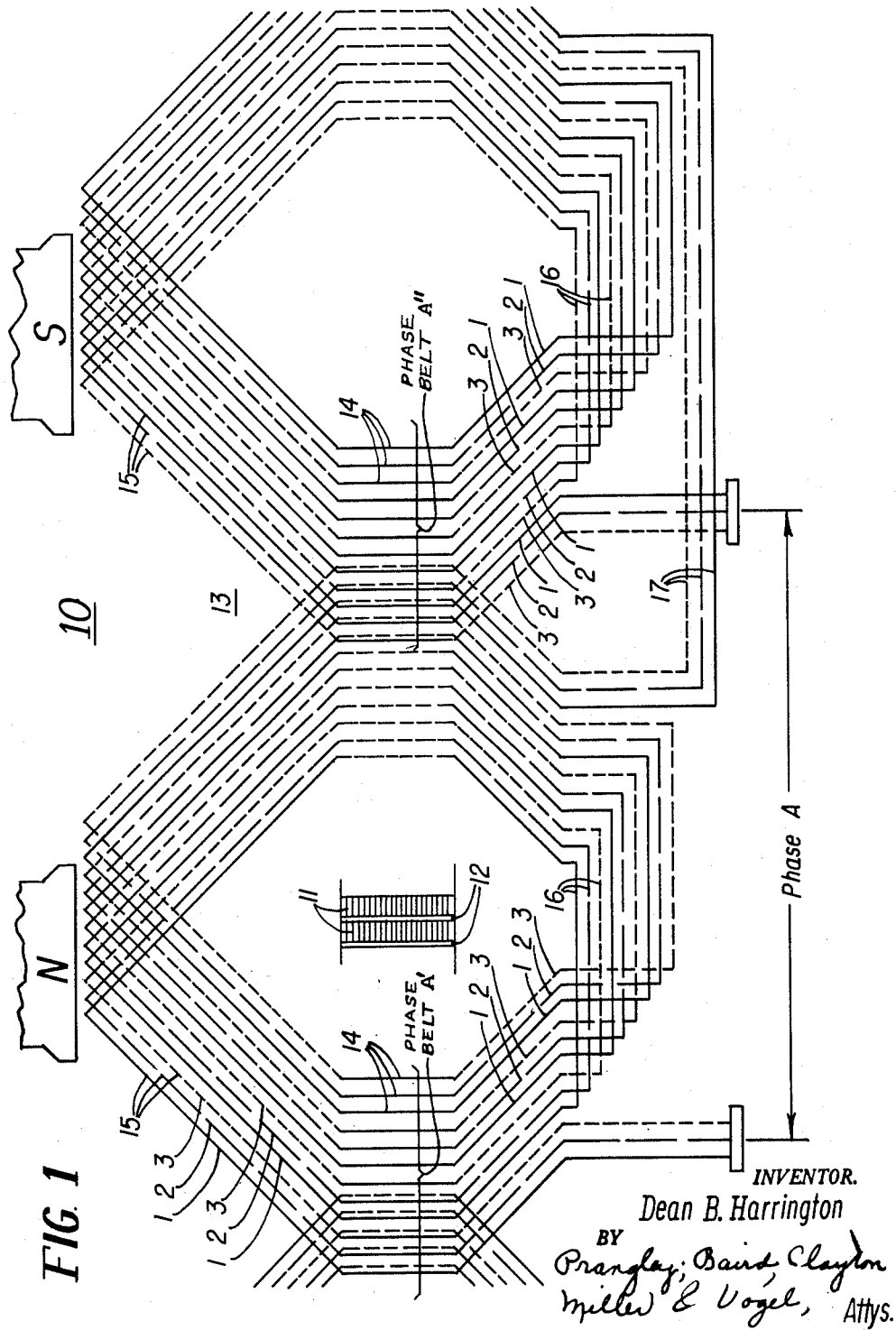
FIGURE 1 is a diagrammatic illustration of a portion of a dynamoelectric machine provided with an armature winding embodying the present invention, the machine being in the form of a generator of 2-pole, 3-phase, 72-slot core construction, the armature winding having three parallel circuits per phase, only one phase of the 3-phase armature winding being illustrated.
Figure 2:
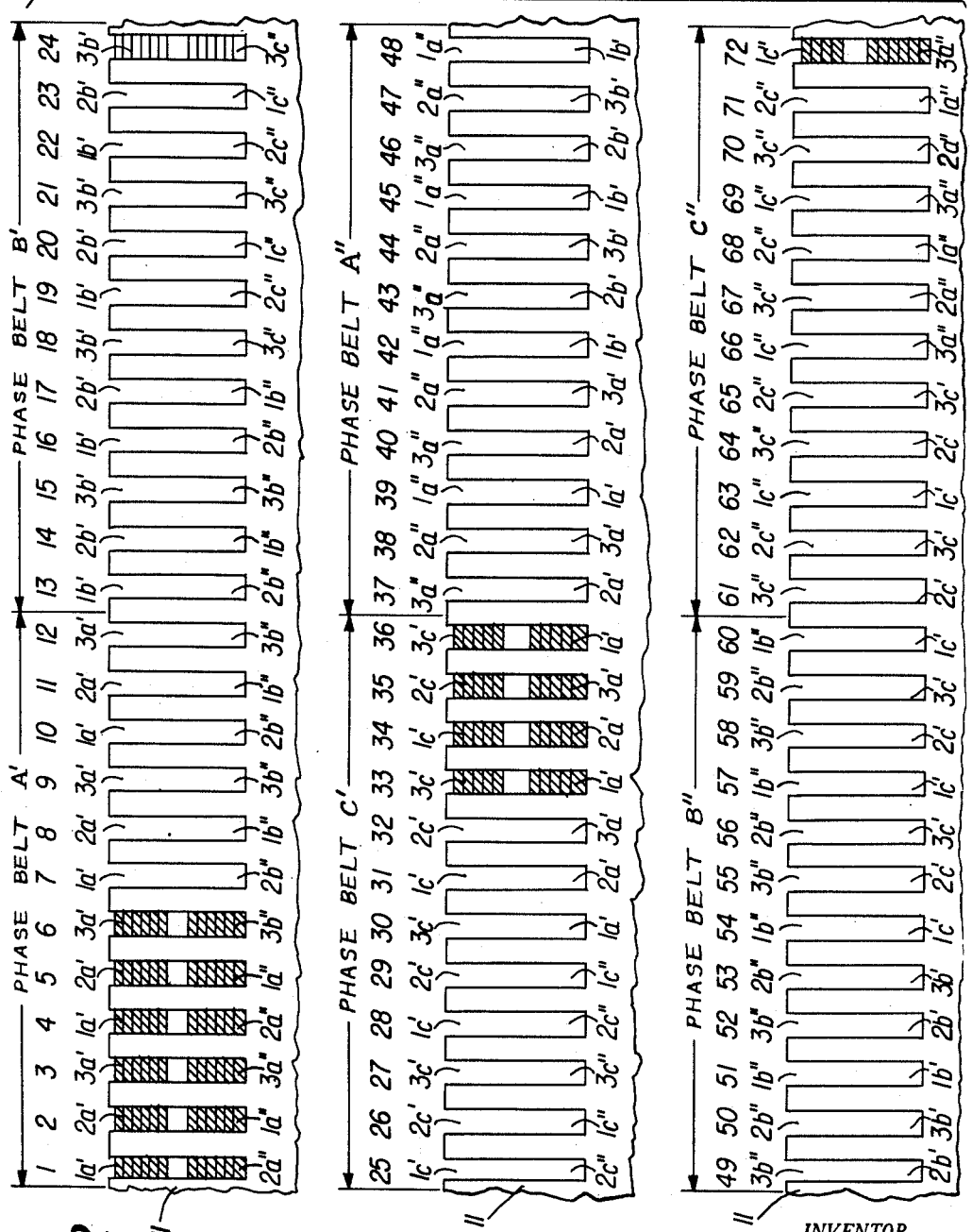
FIG. 2 is an enlarged fragmentary vertical view of the armature element of the generator and the 3-phase armature winding carried in the slots of the core thereof.

Referring now to FIGS. 1 and 2 of the drawings, there is illustrated a dynamoelectric machine 10 in the form of a turbine-driven generator, and embodying the features of the present invention. The generator 10 is of the 2-pole, 3-phase, 3-circuit type, and comprises a stationary armature element or core 11 of magnetizable material and a cooperating rotary field element represented by the poles respectively indicated at N and S. The core 11 comprises seventy-two slots 12; and a 2-layer, 3-phase winding 13 carried by the core 11. The winding 13 comprises the three phases A, B and C and consists of seventy-two coils, each including two coil sides 14 and an end turn or connector 15, as well as a regular connecting end strap 16. In FIG. 1, only phase A of the winding 13 is illustrated; however, in FIG. 2, the arrangement of the coil sides 14 in all three phases A, B and C is illustrated. More particularly, in the generator 10, the pole pitch is thirty-six slots of the core 11; and in the armature winding 13, the coils are chorded having a coil pitch equal to $29/36$ of the pole pitch, as illustrated in FIGS. 1 and 2. However, it will be understood that the invention is readily applicable to other coil pitches, as explained more fully below.

Figure 3:
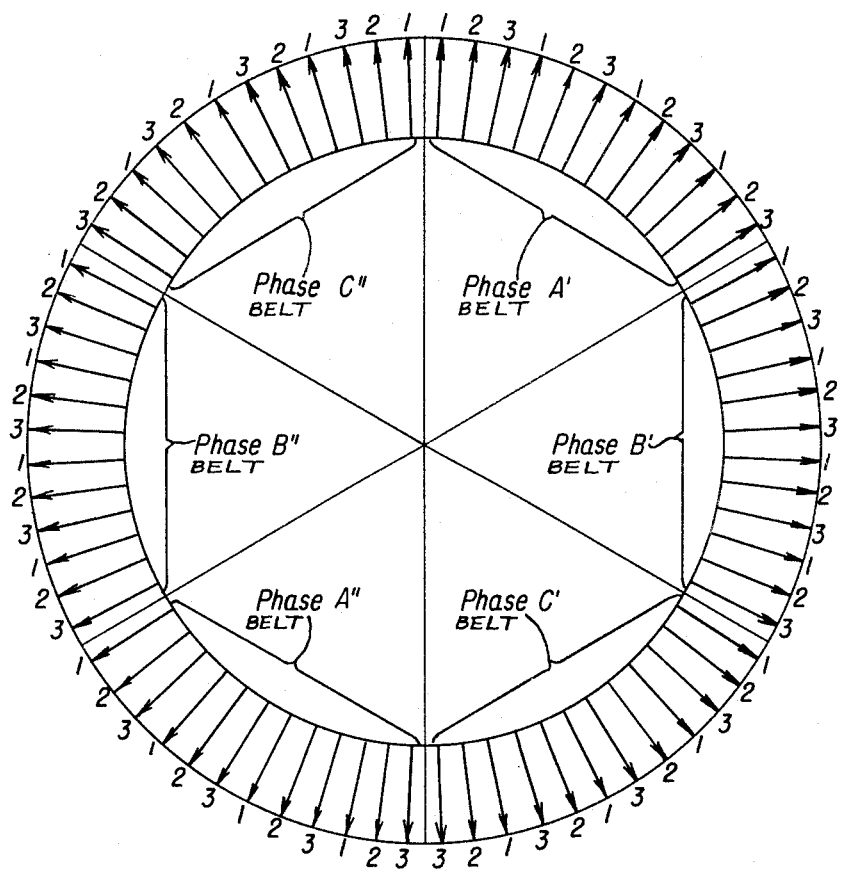
FIG. 3 is a combined schematic diagram of the phase belt arrangement in the armature winding and a vectorial diagram of the phase voltage components induced in the different coils of the armature winding.

As indicated in FIG. 3, the winding 13 comprises three positive phase belts (respectively designated A', B' and C') and three negative phase belts (respectively designated A", B" and C") that are arranged in sequence about the core 11. Each of the phase belts comprises a section of the three parallel connected circuits in the corresponding phase, and each circuit in the section consists of four series connected coils, each having two coil sides 14. The two sections of the three parallel connected circuits in the two phase belts A' and A" in phase A are properly poled and connected in series relation, since one of the phase belts is under the N pole, while the other of the phase belts is under the S pole, so that the phase voltages respectively induced therein are substantially of the same magnitude and exactly in-phase; whereby phase A of the winding 13 comprises the three parallel connected circuits.

Still referring to FIG. 3, each of the six phase belts of the winding 13 subtends sixty electrical degrees and includes twelve coils. It will be noted that the positive phase belt A' includes only coils arranged in the first section of the three parallel circuits designated "1," "2" and "3"; and likewise, the negative phase belts A" includes only coils arranged in the second section of the three parallel circuits designated "1," "2" and "3."

Referring now to FIG. 1, it will be observed that the twelve coil sides 14 of the twelve coils arranged in the positive phase belt A' are distributed in the winding slots 12 of the core 11 in the particular pattern or sequence: 123123123123; whereby the resulting phase voltages in the first section of the three parallel connected circuits 1, 2 and 3 in this phase belt have a high degree of coincidence with each other. In a similar manner, the twelve coil sides 14 of the twelve coils arranged in the negative phase belt A" are distributed in the winding slots 12 of the core 11 in the particular pattern of sequence: 321321321321; whereby the resulting phase voltages in the second section of the three parallel connected circuits 1, 2 and 3 in this phase belt have a high degree of coincidence with each other. Further, it is noted that the sequences: 123123123123 and 321321321321 bear a "mirror image" relationship with respect to each other; whereby the resulting voltages in the three parallel connected circuits 1, 2 and 3 in phase A are exactly in-phase; and, also these voltages are of substantially the same magnitude, as more fully explained below.

As a matter of convenience in following the circuits in FIG. 1, the coil sides 14 included in the circuit 1 have been illustrated in solid lines, the coil sides 14 included in the circuit 2 have been illustrated in broken lines, and the coil sides 14 included in the circuit 3 have been illustrated in dotted lines.

It is noted that the winding patterns of the coils included in phases B and C are identical to those of the coils included in phase A, as illustrated in FIG. 1 and described above; which condition, while not shown in FIG. 1, is fully illustrated in FIG. 2 by the arrangement and disposition of the coil sides 14 in the winding slots 12 of the core 11.

Specifically, as shown in FIG. 2: phase belt A' comprises the winding slots 1 to 12, inclusive, containing the coil sides $1a'$, $2a'$, $3a'$, etc., that are respectively included in the three circuits in this phase belt; phase belt B' comprises the winding slots 13 to 24, inclusive, containing the coil sides $1b'$, $2b'$, $3b'$, etc., that are respectively included in the three circuits in this phase belt; phase belt C' comprises the winding slots 25 to 36, inclusive, containing the coil sides $1c'$, $2c'$, $3c'$, etc., that are respectively included in the three circuits in this phase belt; phase belt A" comprises the winding slots 37 to 48, inclusive, containing the coil sides $3a''$, $2a''$, $1a''$, etc., that are respectively included in the three circuits in this phase belt; phase belt B" comprises the winding slots 49 to 60, inclusive, containing the coil sides $3b''$, $2b''$, $1b''$, etc., that are respectively included in the three circuits in this phase belt; and phase belt C" comprises the winding slots 61 to 72, inclusive, containing the coil sides $3c''$, $2c''$, $1c''$, etc., that are respectively included in the three circuits in this phase belt. Also, the particular inclusion of the three circuits in each phase in the several phase belts is indicated in FIG. 3.

Before considering the performance of the armature winding 13, it is first noted that the p.u. (per unit) voltage of any one of a number of parallel circuits in a phase comprises the ratio between the open-circuit voltage generated in the one circuit and the rated voltage of the phase, and is a measurement of the magnitude of voltage unbalance between the one circuit and the phase. Similarly, the phase angle displacement between the open-circuit voltage generated in the one circuit and the rated voltage of the phase is a measurement of the phase angle of unbalance between the one circuit and the phase. Furthermore, the relative heating in the armature winding is the $I^2R$ losses therein due to load current (and to circulating currents because of the unbalance in voltages and reactances among the multiple circuits), divided by the $I^2R$ losses due to equally divided load current alone.

Thus the performance of phase A of the armature winding 13 is set forth in Table I below:

*Table I*

| Circuit | 1 | 2 | 3 |
|---|---|---|---|
| Voltage Magnitude (p.u.) | 0.9987 | 1.0025 | 0.9987 |
| Voltage Phase Angle (degrees) | 0.0000 | 0.0000 | 0.0000 |

This exceedingly high degree of balance among the three parallel connected circuits 1, 2 and 3 of phase A results in the negligible relative heating in the armature winding 13 of only 1.016 (with the coil pitch of $29/36$) due to the exceedingly small circulating currents among the three parallel connected circuits 1, 2 and 3 in phase A.

At this point, it is mentioned that in an acceptable multi-circuit winding of this character, the maximum allowable magnitude of voltage unbalance is 0.4%; the maximum allowable phase angle displacement is 0.15°; and when the circuits of such a winding exhibit both magnitude of voltage unbalance and phase angle displacement, the limits for both of these items must be appropriately decreased in order to preserve acceptable relative heating of the winding. More particularly, the relative heating of any circuit should not be substantially in excess of about 1.040.

Accordingly, the pattern of the armature winding 13 is not only acceptable, but outstanding with respect to the exceedingly high degree of voltage balance among the three parallel connected circuits in each phase thereof, with the total absence of phase displacement, and the resulting negligible relative heating mentioned.

Furthermore, the reactances of the circuits 1, 2 and 3 in phase A are essentially equal, whereby the phase current in phase A is divided substantially equally in these three circuits. Therefore, the phase current supplied to the load by each of the phases A, B and C of the armature winding 13 is divided substantially equally among the circuits 1, 2 and 3 therein.

The winding pattern of the two phase belts A' and A'' in phase A of the generator 10, as illustrated in FIG. 1 and as described above, is set forth in tabular form in Table II appearing below; and in the arrangement the slot 12 in the core 11 in which the first coil side in phase A is arranged is noted as slot "1," the next adjacent slot 12 is in the core 11 is noted as slot "2," the next adjacent slot 12 in the core 11 is noted as slot "3," etc.:

Table II

| Circuit No: | Coil sides arranged in Slot Nos. |
|---|---|
| 1 | 1, 4, 7, 10, 39, 42, 45, 48 |
| 2 | 2, 5, 8, 11, 38, 41, 44, 47 |
| 3 | 3, 6, 9, 12, 37, 40, 43, 46 |

Of course, it will be understood that the relative heating in the armature winding 13 employing the present winding pattern is dependent upon the coil pitch, as well as the other design factors, such as, the rated flux per pole and per slot. For one particular design, the relative heating in the circuit having the greatest heating is calculated to have the values, as set forth in Table III below:

Table III

| Coil pitch: | Relative heating |
|---|---|
| $25/36$ | 1.157 |
| $26/36$ | 1.003 |
| $27/36$ | 1.046 |
| $28/36$ | 1.181 |
| $29/36$ | 1.016 |
| $30/36$ | 1.048 |
| $31/36$ | 1.202 |
| $32/36$ | 1.025 |
| $33/36$ | 1.047 |
| $34/36$ | 1.220 |

In view of the foregoing explanation, it is apparent that the performance of the present armature winding 13, with the coil pitches $26/36$, $29/36$ and $32/36$, is outstanding, and with the coil pitches $27/36$, $30/36$ and $33/36$ is generally acceptable, and with the coil pitches $25/36$, $28/36$, $31/36$ and $34/36$ is somewhat objectionable.

Again referring to FIG. 1, it will be understood that each coil in each circuit in each phase belt comprises the two coil sides 14 respectively disposed in the top of one of the slots 12 in the core 11 (indicated by the solid line through the area of the core 11) and in the bottom of another of the slots 12 in the core 11 (indicated by the dotted line through the area of the core 11), together with an end turn or connector 15. Also, each two coils in each circuit in each phase belt are interconnected by a regular connecting end strap 16, the connecting end strap 16 extending between the "out" end of one of the coil sides 14 of one of the coils and the "in" end of one of the coil sides 14 of the other of the coils. Further, the four series connected coils in each of the three parallel circuits in the phase belt A' are respectively connected in series relation by three cross-connecting end straps 17 with the four series connected coils in each of the three parallel circuits in the phase belt A''. In the arrangement, the twelve end turns or connectors 15 in each phase belt are symmetrical and identical; and likewise, the nine regular connecting end straps 16 are symmetrical and identical; and moreover, the twelve end turns 15 are essentially identical to the nine regular connecting end straps 16. On the other hand, the three cross-connecting end straps 17 are somewhat different from each other and are entirely different from the regular connecting end straps 16 by virtue of the fact that it is necessary properly to pole the coils included in the phase belt A' with respect to the coils included in the phase belt A''. Recapitulating, all of the end turns or connectors 15 disposed at one end of the armature winding 13 are symmetrical and identical; and all of the regular connecting end straps 16 disposed at the other end of the armature winding 13 are symmetrical and identical. Accordingly, the present arrangement or winding pattern of the armature winding 13 contributes to simplification and economy in the manufacture and assembly thereof into the core 11 of the generator 10.

Figure 4:
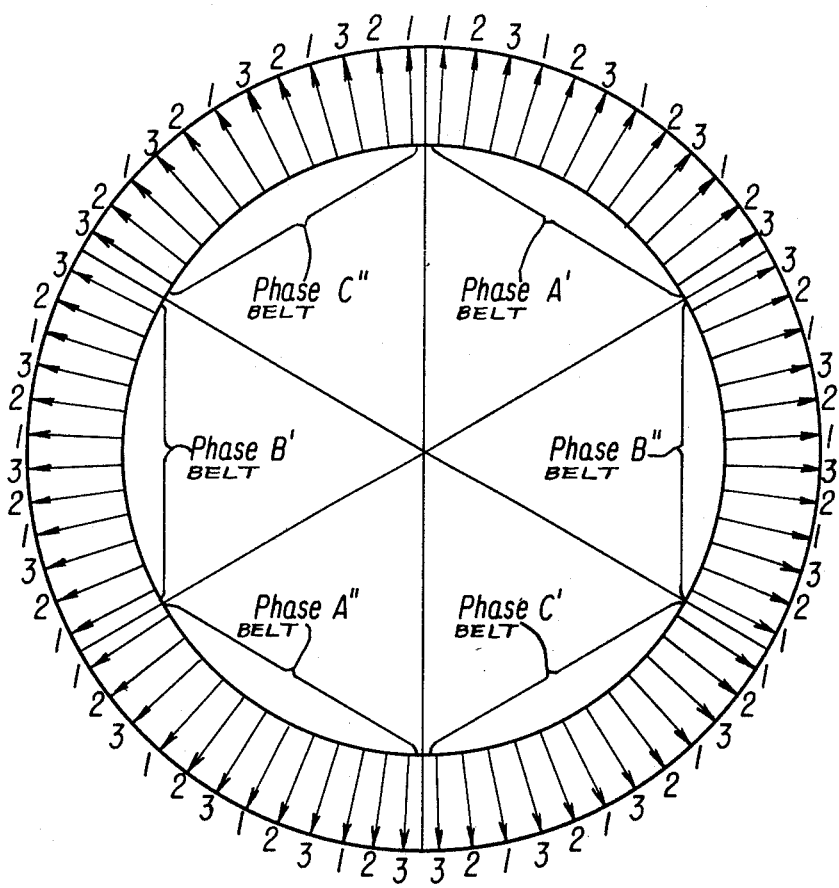
FIG. 4 is a diagram, similar to FIG. 3, illustrating a modification of the pattern of the armature winding.

Referring now to FIG. 4, a modification of the pattern of the armature winding 13 is illustrated, wherein the coil sides 14 in the phase belts B' and B'' have been interchanged with respect to the winding pattern as described in conjunction with FIGS. 1 to 3, inclusive; which interchange or interposition of the coil sides 14 in the phase belts B' and B'' will be readily appreciated by a comparison of the relationships of the phase belts as respectively shown in FIGS. 3 and 4. More particularly, in FIG. 3, the coils in the phase belt B' are disposed sixty electrical degrees in the clockwise direction with respect to the coils in the phase belt A'; whereas in FIG. 4, the coils in the phase belt B' are disposed one hundred and twenty electrical degrees in the counterclockwise direction with respect to the coils in the phase belt A'. Further, it will be appreciated that these two winding patterns are substantially equivalent and may be achieved in a ready manner by the proper poling and cross-connecting of the coils in the three circuits in the phase belts B' and B'' in the phase B, utilizing the cross-connecting end straps 17. This transposition of the coils in the phase belts B' and B'', of course, effects a relative shift between the positions of the top coil sides 14 and the bottom coil sides 14 of the coils included in the phase belts B' and B'' in phase B; whereby there is a slight effect with respect to relative heating, although there is no effect with respect to either the voltage magnitude or the voltage phase angle. Accordingly, the characteristics of Table I are equally applicable to the two winding patterns of FIGS. 3 and 4, while the characteristics of Table III are specifically applicable to the winding pattern of FIG. 3. Specifically, with the winding pattern of FIG. 4, the relative heating of the armature winding 13 is 1.027 (with the coil pitch of $29/36$); whereas with the winding pattern of FIG. 3, the relative heating of the armature winding 13 is only 1.016 (with the coil pitch of $29/36$), as previously explained.

The winding arrangement or pattern of the present invention is very advantageous in view of the fact that it accommodates the three parallel connected circuits per phase in the armature winding 13, effecting a very substantial reduction in the voltages encountered in the generator 10, while maintaining a given k.v.a. rating thereof; whereby the arrangement permits a corresponding reduction in the thickness of the insulation of the casings enclosing the coil sides 14. Now this further permissible reduction in the thickness of the insulation of the casings enclosing the coil sides 14 renders available additional space in the slots 12 in the core 11; which additional space may be used for various additional design purposes. For example, the width of the winding slots may be reduced, so as to effect an increase in the cross-sectional area of the magnetic material of the core 11; on the other hand, the cross-sectional area of the conductors of the coil sides 14 may be increased or the cross-sectional area of the cooling ducts disposed in the slots 12 of the core 11 may be increased. Accordingly, it will be appreciated that the arrangement of the armature winding 13 reduces the voltages encountered in the generator 10, without reducing the k.v.a. rating thereof; whereby the permissible reduction in the required thickness of the insulation of the casings of the coil sides 14 provides the additional space in the winding slots 12 in the core 11 that is available for utilization in design factors effecting an increased rating of the generator 10, and without increasing the physical dimensions thereof.

In view of the foregoing, it is apparent that there has been provided in a polyphase generator, an improved armature winding arrangement that is effective substantially to increase the power output of the generator, without increasing the physical dimensions thereof, and that is simple and economical to manufacture.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A dynamoelectric machine comprising a polyphase winding and a multi-slot core therefor, each phase of said polyphase winding including three parallel connected phase windings arranged in two series connected coil groups respectively disposed under two opposite poles, each coil group of each phase winding being provided with four series connected coils each having two coil sides and arranged in corresponding ones of the slots in said core, the adjacent coil sides of the three phase windings of any given phase being disposed in the sequence: 123123-123123 in one of the corresponding coil groups and the adjacent coil sides of the three phase windings of the given phase being disposed in the sequence: 321321321321 in the other of the corresponding coil groups, where the numerals "1," "2" and "3" respectively indicate the coil sides serially connected in the respective ones of the three parallel connected phase windings in the given phase of said polyphase winding.

2. The dynamoelectric machine set forth in claim 1, wherein said core is provided with 72 slots per pair of poles and a consequent pole pitch of 36 slots, said polyphase winding comprises three phases and is arranged in two layers in the slots of said core, and each of the twelve coils in each of said coil groups is chorded.

3. The dynamoelectric machine set forth in claim 2, wherein each of said chorded coils has a pitch of $29/36$ of said pole pitch.

4. The dynamoelectric machine set forth in claim 2, wherein each of said chorded coils has a pitch of $29/36$ of said pole pitch.

5. The dynamoelectric machine set forth in claim 2, wherein each of said chorded coils has a pitch of $32/36$ of said pole pitch.

6. The dynamoelectric machine set forth in claim 1, wherein the relative heating in said polyphase winding is not in excess of 1.040, where the relative heating in said polyphase winding is equal to the total $I^2R$ losses therein due both to load current and to circulating currents divided by the $I^2R$ losses therein due only to equally divided load current.

7. The dynamoelectric machine set forth in claim 1, wherein each coil includes an end turn extending between the "out" end of one of its coil sides and the "in" end of the other of its coil sides, wherein each two series connected coils include an end strap extending between the "out" end of one of the coil sides of one of the coils and the "in" end of one of the coil sides of the other of the coils, wherein the end turns incorporated in the coils of said polyphase winding are substantially identical to each other, and wherein at least a majority of the end straps incorporated in the coils of said polyphase winding are substantially identical to each other.

References Cited in the file of this patent

UNITED STATES PATENTS

| | | |
|---|---|---|
| 1,782,263 | Gay | Nov. 18, 1930 |
| 1,832,700 | Gay | Nov. 17, 1931 |
| 2,778,963 | Hoberman | Jan. 22, 1957 |

FOREIGN PATENTS

| | | |
|---|---|---|
| 796,940 | Great Britain | June 25, 1958 |
| 1,194,564 | France | May 11, 1959 |

OTHER REFERENCES

Croft, T.: Alternating Current Armature Windings, McGraw-Hill, 1924; pp. 16 and 25.

Standard Handbook of Electrical Engineers, seventh edition, McGraw-Hill, New York, 1941 p. 636, secs. 7–10, 7–11.